(12) United States Patent
Cho et al.

(10) Patent No.: US 10,052,851 B2
(45) Date of Patent: Aug. 21, 2018

(54) FIBER REINFORCED PLASTIC MEMBER FOR VEHICLE AND METHOD OF PRODUCING THE SAME

(71) Applicant: Hyundai Motor Company, Seoul (KR)

(72) Inventors: Jeong Min Cho, Suwon-Gyeonggi-do (KR); Chi Hoon Choi, Gyeonggi-do (KR); Hae Hoon Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 248 days.

(21) Appl. No.: 14/960,343

(22) Filed: Dec. 5, 2015

(65) Prior Publication Data

US 2017/0001418 A1 Jan. 5, 2017

(30) Foreign Application Priority Data

Jul. 1, 2015 (KR) ........................ 10-2015-0094361

(51) Int. Cl.
*B32B 27/08* (2006.01)
*B32B 7/00* (2006.01)
(Continued)

(52) U.S. Cl.
CPC .............. *B32B 27/08* (2013.01); *B29C 70/32* (2013.01); *B29C 70/347* (2013.01); *B32B 5/028* (2013.01); *B32B 5/10* (2013.01); *B32B 5/142* (2013.01); *B32B 5/26* (2013.01); *B32B 7/005* (2013.01); *B32B 7/04* (2013.01); *B32B 7/12* (2013.01); *B32B 15/04* (2013.01); *B32B 15/14* (2013.01); *B62D 25/04* (2013.01); *B32B 37/06* (2013.01);
(Continued)

(58) Field of Classification Search
CPC ................................ B32B 5/028; B62D 25/04

USPC .............. 87/1; 296/193.06; 442/59; 264/165
See application file for complete search history.

(56) References Cited

U.S. PATENT DOCUMENTS

| 6,431,531 B1 | 8/2002 | Yu et al. |
| 2008/0156425 A1* | 7/2008 | Howe ................ B62D 25/04 |
| | | 156/245 |
| 2010/0083815 A1* | 4/2010 | Inazawa ............. B29C 53/588 |
| | | 87/1 |

FOREIGN PATENT DOCUMENTS

| JP | 2004-108732 A | 4/2004 |
| JP | 2006-167977 A | 6/2006 |

(Continued)

*Primary Examiner* — Matthew D Matzek
(74) *Attorney, Agent, or Firm* — Mintz Levin Cohn Ferris Glovsky and Popeo, P.C.; Peter F. Corless

(57) ABSTRACT

The fiber-reinforced plastic member includes a continuous variation layer which includes a synthetic resin constituting a base and a plurality of reinforcement fibers embedded in the synthetic resin, and a reinforcing layer which is attached to the continuous variation layer to constitute the fiber-reinforced plastic member for a vehicle and is composed of a synthetic resin constituting the base and a plurality of reinforcement fibers.

In particular, the plurality of reinforcement fibers in the continuous variation layer are arranged so as to be inclined with respect to a longitudinal direction of the fiber-reinforced plastic member for a vehicle and angles of the reinforcement fibers with respect to the longitudinal direction of the fiber-reinforced plastic member progressively varying along the longitudinal direction and the plurality of reinforcement fibers in the reinforcing layer are embedded in the synthetic resin and intersecting each other in a reticular pattern.

10 Claims, 5 Drawing Sheets

(51) Int. Cl.
  *B62D 25/04* (2006.01)
  *B29C 70/32* (2006.01)
  *B29C 70/34* (2006.01)
  *B32B 5/02* (2006.01)
  *B32B 5/10* (2006.01)
  *B32B 5/14* (2006.01)
  *B32B 5/26* (2006.01)
  *B32B 7/04* (2006.01)
  *B32B 7/12* (2006.01)
  *B32B 15/04* (2006.01)
  *B32B 15/14* (2006.01)
  *B32B 37/06* (2006.01)
  *B32B 37/10* (2006.01)
  *B32B 37/18* (2006.01)
  *B32B 38/00* (2006.01)

(52) U.S. Cl.
  CPC ............... *B32B 37/10* (2013.01); *B32B 37/18* (2013.01); *B32B 2038/0076* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2307/558* (2013.01); *B32B 2605/00* (2013.01)

(56) References Cited

FOREIGN PATENT DOCUMENTS

| | | |
|---|---|---|
| JP | 2011-056816 A | 3/2011 |
| KR | 2009-0016805 A | 2/2009 |
| KR | 2012-0096057 A | 8/2012 |
| KR | 2013-0012871 A | 2/2013 |
| KR | 10-2013-0138095 A | 12/2013 |

* cited by examiner

US 10,052,851 B2

FIBER REINFORCED PLASTIC MEMBER FOR VEHICLE AND METHOD OF PRODUCING THE SAME

CROSS-REFERENCE TO RELATED APPLICATION

This application claims the priority benefit of Korean Patent Application No. 10-2015-0094361, filed on Jul. 1, 2015, in the Korean Intellectual Property Office, the disclosure of which is incorporated herein by reference.

TECHNICAL FIELD

The present invention relates to a fiber-reinforced plastic member for a vehicle and a method of producing the same. The fiber-reinforced plastic member may satisfy the requirement for different strengths in different areas in order to improve the collision safety performance of a vehicle body, reduce the weight of the vehicle body and improve the efficiency of the manufacturing process.

BACKGROUND

Generally, fiber-reinforced plastic members have been used in vehicles as a structural objects that constitute vehicle bodies. Fiber-reinforced plastic members have been essentially used to absorb the energy of external impacts in order to ensure the safety of passengers in the vehicle interior in the event of a collision, and to have different strengths in different areas in order to withstand the damage caused by impacts.

Accordingly, technologies for satisfying the requirement for performance that differs by area have been extensively used, and have been characterized by employing metal members prepared through local softening, hot stamping, or the like.

The requirement for a vehicle body to exhibit different strengths in different areas and to be lightweight may be achieved by adopting a fiber-reinforced plastic composite composed of a synthetic resin and reinforcement fibers embedded in the synthetic resin, which can have a higher strength in the direction in which the reinforcement fibers extend and is lighter than general metals, or by bonding the fiber-reinforced plastic composite to a metal member to realize a composite member having a desired shape.

The general fiber-reinforced plastic composite composed of reinforcement fibers may be produced through a resin transfer molding (RTM) process. The RTM process is carried out in such a way as to dispose fiber mesh plates, which have been previously prepared, in a metal mold and to impregnate the mesh plates with synthetic resin, thus providing a fiber-reinforced plastic composite. Alternatively, the RTM process may be carried out in such a way as to layer fiber mesh plates impregnated with synthetic resin on each other.

In the case of producing a fiber-reinforced plastic composite including reinforcement fibers through an RTM process, the requirement may be satisfied to exhibit different strengths in different areas by orienting fiber mesh plates such that reinforcement fibers of the oriented fiber mesh plates can exert the required strengths, or by adjusting the number of reinforcement fiber mesh plates in respective areas.

In a certain example, a Korean conventional art has disclosed a method of producing cross member for commercial vehicle.

However, among such processes of producing a fiber-reinforced plastic composite, the process of layering reinforcement fiber mesh plates such that the directions of the respective reinforcement fiber mesh plates are different from each other may have disadvantageous. For example, it is difficult to progressively change the strengths in different area as required, and efficient transmission of stress may be not realized due to the presence of disconnected portions between reinforcement fibers. Accordingly, the number of reinforcement fiber mesh plates has to be increased in order to satisfy the required strengths, which is inefficient. Furthermore, since impregnating the reinforcement fiber mesh plates, disposed in a mold, with synthetic resin must be fulfilled through an additional procedure, the number of processes may be disadvantageously increased.

The information disclosed in this section are merely for the enhancement of understanding of the general background of the invention, and should not be taken as an acknowledgment or any form of suggestion that the matters form the related art already known to a person skilled in the art.

SUMMARY OF THE INVENTION

In preferred aspects, the present invention provides a fiber-reinforced plastic member for a vehicle and a method of producing the same. Thus, the fiber-reinforced plastic member may satisfy the requirement for different strengths in different areas in order to improve the collision safety performance of a vehicle body, and further reduce the weight of the vehicle body and improved the efficiency of the manufacturing process.

In one aspect of the present invention, the fiber-reinforced plastic member for a vehicle may comprise a continuous variation layer and a reinforcing layer. In particular, a continuous variation layer may include a synthetic resin constituting a base and a plurality of reinforcement fibers embedded in the synthetic resin, the plurality of reinforcement fibers may be arranged so as to be inclined with respect to the longitudinal direction of the fiber-reinforced plastic member for a vehicle, and the angles of the reinforcement fibers with respect to the longitudinal direction of the fiber-reinforced plastic member progressively may vary along the longitudinal direction. Further, in particular, the reinforcing layer may be attached to the continuous variation layer to constitute the fiber-reinforced plastic member for a vehicle, and may comprise a synthetic resin constituting the base and a plurality of reinforcement fibers. The plurality of reinforcement fibers in the reinforcing layer may be embedded in the synthetic resin and intersecting each other in a reticular pattern.

Preferably, the reinforcing layer may be attached to the continuous variation layer by applying thermal compression bonding, adhesive or the like.

The reinforcement fibers of the reinforcing layer may include a first group of fibers and a second group of fibers. Preferably, the first group of fibers may be arranged to intersect reinforcement fibers of the continuous variation layer disposed at one side of the continuous variation layer, and the second group of fibers may be arranged to intersect reinforcement fibers of the continuous variation layer disposed at another side of the continuous variation layer, and the first and second groups of fibers may be arranged to intersect each other in a reticular pattern.

The continuous variation layer and the reinforcing layer may constitute a pillar for a vehicle. Preferably, the reinforcement fibers of the continuous variation layer in the pillar for a vehicle may be arranged in the anteroposterior direction of the vehicle at the lower end of the pillar and may be arranged in the vertical direction of the vehicle at the upper end of the pillar.

The reinforcement fibers of the reinforcing layer may include a first group of fibers and a second group of fibers. Preferably, the first group of fibers may be arranged to intersect reinforcement fibers of the continuous variation layer at the lower end of the pillar, and the second group of fibers may be arranged to intersect reinforcement fibers of the continuous variation layer at the upper end of the pillar. Further, the first and second groups of fibers may be arranged to intersect each other in a reticular pattern.

The fiber-reinforced plastic member for a vehicle may further include a metal layer layered to the continuous variation layer and the reinforcing layer, wherein the continuous variation layer, the reinforcing layer and the metal layer may be layered to each other to form a plate shape, and are subjected to a heat press process, thus resulting in the fiber-reinforced plastic member for a vehicle.

In another aspect of the present invention, provided is a method of producing a fiber-reinforced plastic member for a vehicle that may comprise: winding a reinforcement fiber, impregnated with synthetic resin, around a mandrel in such a way that the angle of the reinforcement fiber progressively varies along the length of the mandrel, thus forming a pipe-shaped continuous variation layer; flattening the pipe-shaped continuous variation layer into a flat plate; layering the flat plate-shaped continuous variation layer and a reinforcing layer comprising a synthetic resin and a plurality of reinforcement fibers embedded in the synthetic resin to intersect each other in a reticular pattern; and integrally pressing both layers into the fiber-reinforced plastic member through a heat press process.

In winding the reinforcement fiber, the angle of the reinforcement fiber of the continuous variation layer may be varied by adjusting the rotational speed of the mandrel.

In winding the reinforcement fiber, the angle of the reinforcement fiber of the continuous variation layer may be varied by adjusting the moving speed of the mandrel in the longitudinal direction of the mandrel.

In winding the reinforcement fiber, the angle of the reinforcement fiber of the continuous variation layer may be varied by adjusting the moving speed of a fiber positioning device, adapted to guide the fiber to the mandrel, in the longitudinal direction of the mandrel.

In the layering and shaping, the flat plate-shaped continuous variation layer and the reinforcing layer, which may comprise a synthetic resin and a plurality of reinforcement fibers embedded in the synthetic resin to intersect each other in a reticular pattern, may be layered to a metal layer, and the three layered layers may be integrally pressed into the fiber-reinforced plastic member through the heat press process.

Further provided is a vehicle that may comprise the fiber-reinforced plastic member as described herein.

Other aspects of the invention are disclosed infra.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

The terminology used herein is for the purpose of describing particular embodiments only and is not intended to limit the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuel derived from resources other than petroleum. As referred to herein, a hybrid vehicle is a vehicle that has two or more sources of power, for example both gasoline-powered and electric-powered vehicles.

Reference will now be made in detail to the various exemplary embodiments of the present invention, examples of which are illustrated in the accompanying drawings.

Figure 1:
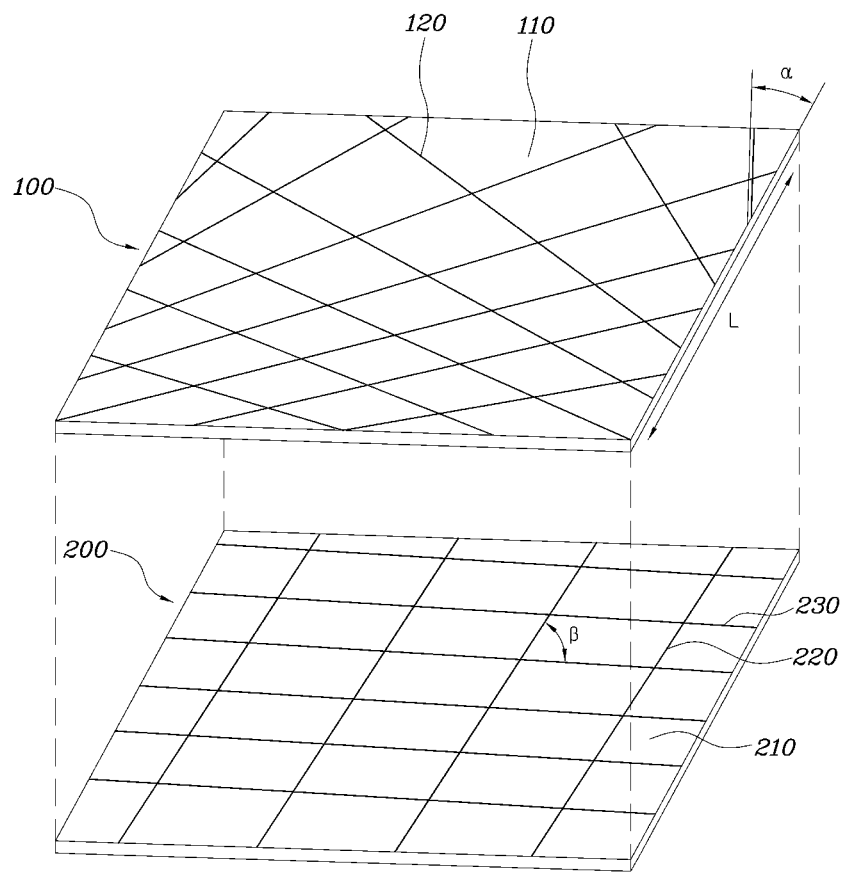
FIG. 1 shows an exemplary coupling relationship between an exemplary continuous variation layer and an exemplary reinforcing layer of a fiber-reinforced plastic member for a vehicle according to an exemplary embodiment of the present invention.
Figure 2:
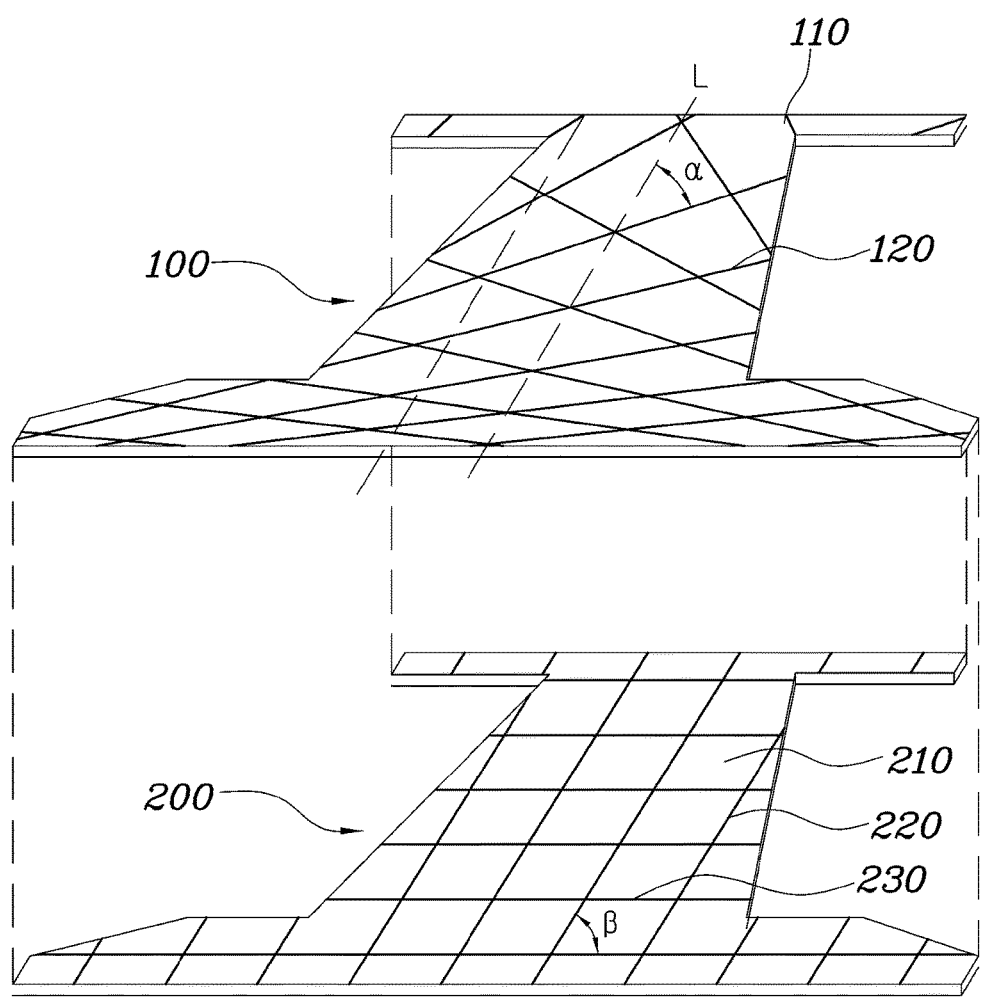
FIG. 2 shows the continuous variation layer and the reinforcing layer shown in FIG. 1 as being applied to an exemplary pillar of a vehicle.
Figure 3:
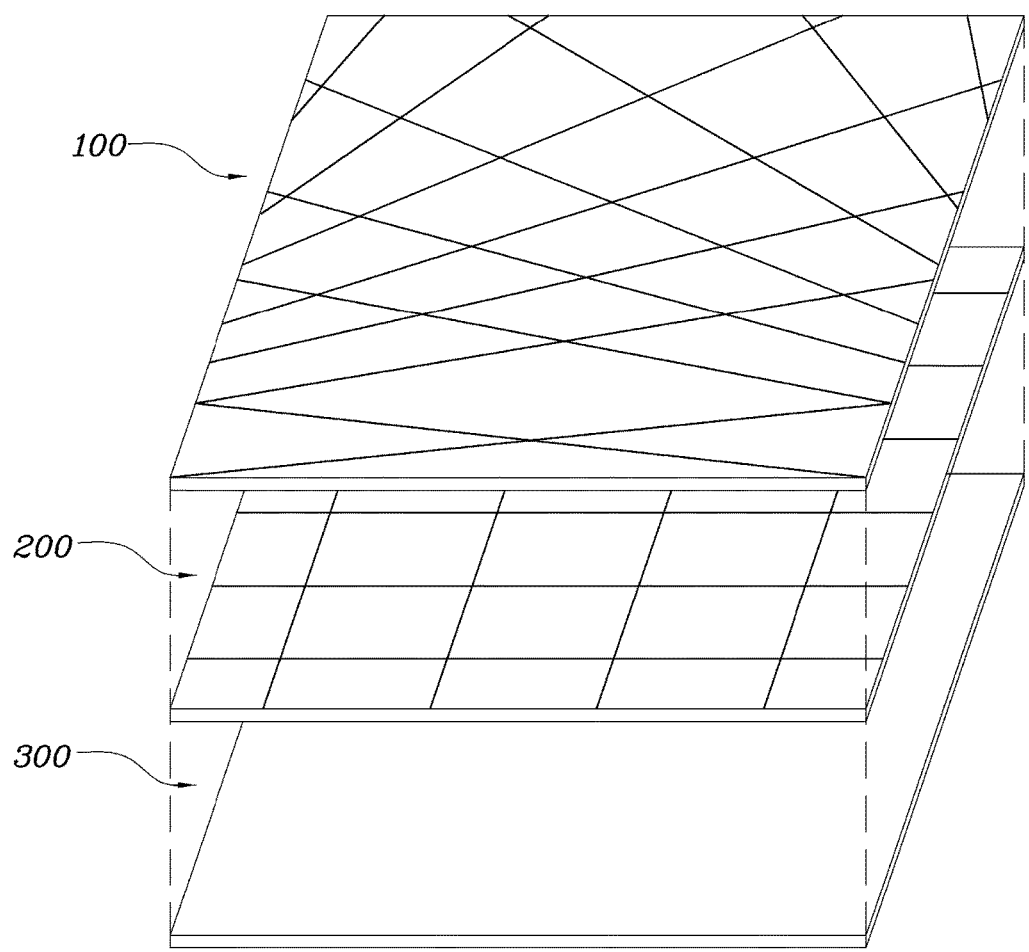
FIG. 3 shows an exemplary coupling relationship between an exemplary continuous variation layer, an exemplary reinforcing layer and an exemplary metal layer of the fiber-reinforced plastic member for a vehicle according to an exemplary embodiment of the present invention.
Figure 4:
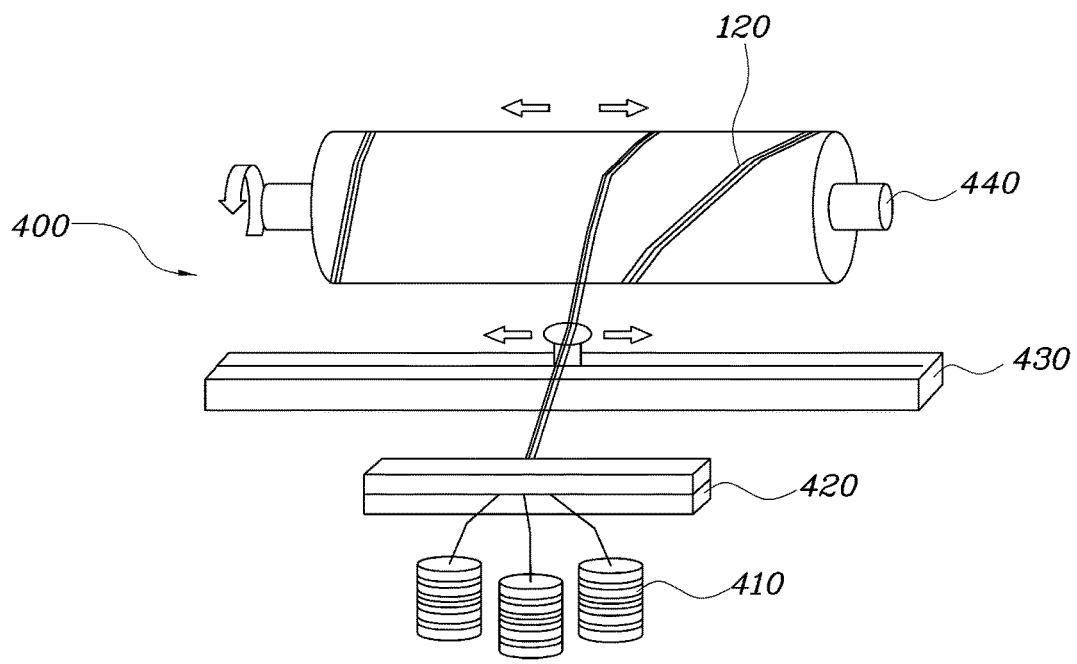
FIG. 4 shows an exemplary process of producing the continuous variation layer shown in FIG. 1 according to an exemplary embodiment of the present invention.
Figure 5:
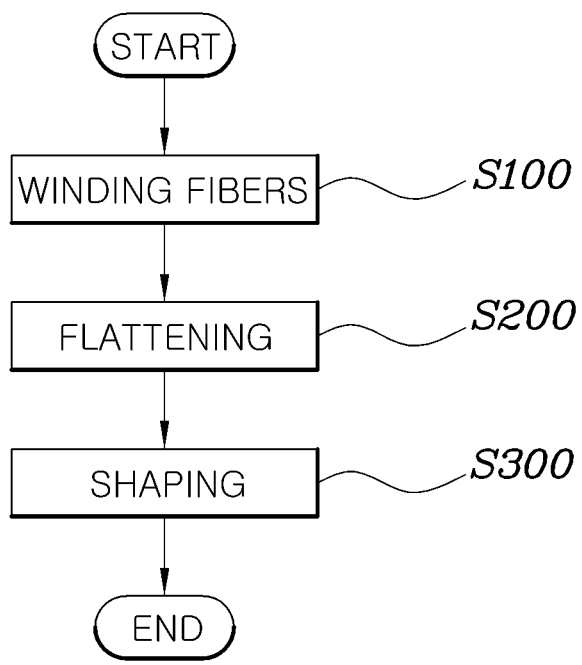
FIG. 5 illustrates an exemplary process of producing the fiber-reinforced plastic member for a vehicle according to an exemplary embodiment of the present invention.

FIG. 1 shows the coupling relationship between a continuous variation layer 100 and a reinforcing layer 200 of the fiber-reinforced plastic member for a vehicle according to an exemplary embodiment of the present invention. FIG. 2 shows the continuous variation layer 100 and the reinforcing layer 200 shown in FIG. 1 as being applied to a pillar. FIG. 3 shows the coupling relationship between a continuous variation layer 100, a reinforcing layer 200 and a metal layer 300 of a fiber-reinforced plastic member for a vehicle according to an exemplary embodiment of the present invention. FIG. 4 shows the process of producing the continuous variation layer 100 shown in FIG. 1. FIG. 5 illustrates the process of producing the fiber-reinforced plastic member for a vehicle according to the embodiment of the present invention.

As shown in FIGS. 1 to 3, the fiber-reinforced plastic member for a vehicle according to an embodiment of the present invention may include a continuous variation layer 100, which may comprise a synthetic resin 110 constituting the base and a plurality of reinforcement fibers 120 embedded in the synthetic resin 110. In the continuous variation layer, the plurality of reinforcement fibers 120 may be arranged at an incline with respect to the longitudinal direction of the fiber-reinforced plastic member and the angles α of the reinforcement fibers 120 with respect to the longitudinal direction progressively may vary along the longitudinal direction. Further, a reinforcing layer 200, may be attached to the continuous variation layer 100 to constitute the fiber-reinforced plastic member and comprise a synthetic resin 210 constituting the base and a plurality of reinforcement fibers, which may be embedded in the synthetic resin 210 and intersect each other in a reticular pattern.

The fiber-reinforced plastic member for a vehicle according to the embodiment of the present invention may include the continuous variation layer 100 and the reinforcing layer 200, in which the respective synthetic resins may suitably be of various different types, such as carbon fibers, glass fibers and aramid fibers.

It has heretofore been common to use an inefficient composite material, which includes a general metal member having an excessively heavy weight or does not have different strengths in different areas. The fiber-reinforced plastic member for a vehicle according to exemplary embodiments of the present invention may include the continuous variation layer 100 which has progressively varying strengths in the longitudinal direction, which may satisfy the requirement for the strength to vary progressively by area and reduce the weight of the fiber-reinforced plastic member.

Furthermore, since the fiber-reinforced plastic member for a vehicle according to an exemplary embodiment of the present invention may include the reinforcing layer 200 layered to the continuous variation layer 100, the present invention has advantages of increasing the strength of the fiber-reinforced plastic member and improving the durability thereof by preventing the separation between fibers.

In particular, the continuous variation layer 100 may have a flat plate, which may include the synthetic resin 110 serving as the base and the plurality of reinforcement fibers 120 embedded in the synthetic resin 110. The required strength and load may be controlled by adjusting the thickness of the flat plate including the reinforcement fibers 120 or stacking a plurality of continuous variation layers 100.

In particular, the reinforcement fibers 120 of the continuous variation layer 100 may be arranged at an incline with respect to the longitudinal direction of the fiber-reinforced plastic member such that the angles α of the reinforcement fibers 120 with respect to the longitudinal direction progressively may vary along the longitudinal direction.

The angles α of the reinforcement fibers 120 may be determined in consideration of the relationship with the longitudinal center line L of the fiber-reinforced plastic member, and may vary in accordance with the required strengths for respective areas. The reinforcement fibers 120 of the continuous variation layer 100 may comprise only a first group of fibers 120 oriented in a single direction, or may comprise the first group of fibers 120 and a second group of fibers having different angles with respect to the longitudinal direction of the fiber-reinforced plastic member.

The fiber-reinforced plastic member for a vehicle requires strengths that are different in different areas because the applied loads or impacts are different in each area. Accordingly, the reinforcement fibers, which have a high strength in the longitudinal direction thereof, may be arranged in the direction of transmission of a load or impact so as to enhance the strength of the fiber-reinforced plastic member, or the reinforcement fibers may be arranged in another direction to enhance flexibility while decreasing the strength.

The required strengths, which are different in respective areas of the fiber-reinforced plastic member, may continuously vary along the direction of load or impact transmission. Hence, in order to satisfy the different required strengths of the fiber-reinforced plastic member, the reinforcement fibers 120 may be arranged such that the angles α of the reinforcement fibers 120 with respect to the longitudinal direction of the fiber-reinforced plastic member progressively vary.

According to a conventional solution employing the RTM process, reticular sheets including reinforcement fibers that intersect each other are differently cut and oriented and layered in accordance with different areas of the fiber-reinforced plastic member in consideration of the angles of the reinforcement fibers with respect to the direction of load and impact transmission. However, it is difficult to realize the orientation of the reinforcement fibers at different angles so as to satisfy the requirement for progressively varying strengths. Furthermore, since there are disconnected portions between the reticular sheets, the transmission of stress may be inefficient, and thus the strength properties may be deteriorated.

In contrast, since the fiber-reinforced plastic member according to various exemplary embodiments of the present invention may be constructed such that the angles α of the reinforcement fibers 120 with respect to the longitudinal center line L of the fiber-reinforced plastic member vary progressively, it is possible to reliably satisfy the required strengths of the fiber-reinforced plastic member which are different in respective areas. Furthermore, since there is no discontinuous portion in the respective reinforcement fibers 120 in the fiber-reinforced plastic member, a fiber-reinforced plastic member having improved strength properties may be provided by virtue of the efficient transmission of stress.

The reinforcing layer 200, which may have a flat plate, may be attached to the continuous variation layer 100 in a surface contact manner so as to constitute the fiber-reinforced plastic member. The reinforcing layer 200 may have the same strength in all directions by virtue of the plurality of reinforcement fibers, which may be embedded in the synthetic resin 210 serving as the base such that they intersect each other to form a reticular pattern.

Reinforcing fibers, which may be coupled to each other, may typically exhibit separation therebetween due to impact applied thereto. However, the reinforcement fibers of the reinforcing layer 200 according to exemplary embodiments may be arranged in a reticular pattern so as to function to prevent the separation between reinforcement fibers as well as the separation between the reinforcement fibers of the continuous variation layer 100 layered on the reinforcing layer 200, thus improving the overall durability of the fiber-reinforced plastic member for a vehicle.

In other words, the reinforcing layer 200 may serve to prevent the separation between the reinforcement fibers 120, which may otherwise occur in various coupling directions of the reinforcing fibers 120 of the continuous variation layer 100 due to the various angles α of the reinforcement fibers 120.

In contrast to the continuous variation layer 100, which exhibits increased strength in a specific direction, the reinforcing layer 200 may evenly reinforce the strength of the fiber-reinforced plastic member in all directions, thus enabling an increase in the overall strength of the fiber-reinforced plastic member for a vehicle.

As shown in FIGS. 1 to 3, the reinforcement fibers constituting the reinforcing layer 200 according to an exemplary embodiment of the present invention may include a first group of fibers 220 and a second group of fibers 230. The first group of fibers 220 may be arranged to intersect the reinforcement fibers 120 disposed at one side of the continuous variation layer 100, and the second group of fibers 230 may be arranged to intersect the reinforcement fibers 120 disposed at another side of the continuous variation layer 100. Accordingly, the first group of fibers 220 and the second group of fibers 230 may be arranged to intersect each other so as to form a reticular pattern.

Since the angles α of the reinforcement fibers 120 of the continuous variation layer 100 with respect to the longitudinal direction of the fiber-reinforced plastic member may vary progressively, the angle α of a reinforcement fiber 120 disposed at one side of the fiber-reinforced plastic member may be different from that of a reinforcement fiber 120 disposed at another side of the fiber-reinforced plastic member. The arrangement of the reinforcement fibers of the reinforcing layer 200, which intersect each other to form a reticular pattern, may be suitably determined depending on the relationship with the orientation of the reinforcement fibers 120 of the continuous variation layer 100.

The reinforcement fibers of the reinforcing layer 200 may be classified into the first group of fibers 220 and the second group of fibers 230 depending on the orientation.

The first group of fibers 220 may be arranged throughout the reinforcing layer 200 such that they may intersect the reinforcement fibers 120 disposed at one side of the continuous variation layer 100 so as to efficiently prevent the separation between the reinforcement fibers 120 disposed at the one side of the continuous variation layer 100.

The second group of fibers 230 may be arranged throughout the reinforcing layer 200 such that they may intersect the reinforcement fibers 120 disposed at another side of the continuous variation layer 100 so as to efficiently prevent the separation between the reinforcement fibers 120 disposed at the another side of the continuous variation layer 100.

Accordingly, the first group of fibers 220 and the second group of fibers 230, which may be arranged throughout the reinforcing layer 200 in different directions, may intersect each other to form a reticular pattern. The coupling angle β between the first and second groups of fibers 220 and 230 having the reticular pattern and specific configurations thereof may be determined depending on the angles α of the reinforcement fibers 120 disposed at one side and another side of the continuous variation layer 100.

As shown in FIG. 2, when the fiber-reinforced plastic member for a vehicle according to an exemplary embodiment of the present invention constitutes a pillar, the reinforcement fibers 120 constituting the continuous variation layer 100 may be arranged at the lower end of the pillar in the anteroposterior direction of the vehicle and may be arranged at the upper end of the filter in the vertical direction of the vehicle.

The fiber-reinforced plastic member for a vehicle according to the embodiment of the present invention may be applied to various vehicular pillars, such as an A-pillar, a B-pillar, a C-pillar and a D-pillar. Among the various pillars, FIG. 2 shows an exemplary B-pillar.

For example, the B-pillar may be provided in the vertical direction between the front door and the rear door of a vehicle. In this case, the B-pillar may require different strength properties and orientations of reinforcement fibers at upper and lower ends thereof in consideration of the direction of application of an impact or load which may be generated at the vehicle.

Accordingly, the reinforcement fibers 120 of the continuous variation layer 100 may be arranged in the vertical direction at the upper end of the B-pillar and may be arranged in the anteroposterior direction at the lower end of the B-pillar. In other words, the reinforcement fibers 120 may be arranged in accordance with the direction of application of impact or load at the upper and lower end of the B-pillar so as to satisfy the required strengths for the respective areas.

As shown in FIG. 2, the reinforcement fibers constituting the reinforcing layer 200 of the fiber-reinforced plastic member for a vehicle according to an exemplary embodiment of the present invention serving as a pillar may include the first group of fibers 220 and the second group of fibers 230. The first group of fibers 220 may be oriented in the direction crossing the reinforcement fibers 120 embedded in the continuous variation layer 100 of the lower end of the pillar, and the second group fibers 230 may be oriented in the direction crossing the reinforcement fibers 120 embedded in the continuous variation layer 100 of the upper end of the pillar. As a result, the first group of fibers 220 and the second group of fibers 230, which may be arranged to intersect each other, may form a reticular pattern.

In particular, the first group of fibers 220 of the reinforcing layer 200, which are arranged throughout the reinforcing layer 200 of the B-pillar, may be disposed at the lower end of the B-pillar in the vertical direction of a vehicle such that they may intersect the reinforcement fibers 120 arranged in the anteroposterior direction of the vehicle so as to prevent separation between the reinforcement fibers 120 of the lower end of the continuous variation layer 100.

The second group of fibers 230 of the reinforcing layer 200, which are arranged throughout the reinforcing layer 200 of the B-pillar, may be disposed at the upper end of the B-pillar in the anteroposterior direction of a vehicle such that they may intersect the reinforcement fibers 120 arranged in the vertical direction of the vehicle so as to prevent separation between the reinforcement fibers 120 of the upper end of the continuous variation layer 100.

Consequently, the first group of fibers 220, which are embedded throughout the reinforcing layer 200 and are arranged in the vertical direction of a vehicle, and the second group of fibers 230, which are arranged in the anteroposterior direction of the vehicle, may intersect each other in the anteroposterior and vertical directions of the vehicle, thus forming a reticular pattern.

As shown in FIG. 3, a fiber-reinforced plastic member for a vehicle according to an exemplary embodiment of the present invention may further include a metal layer 300, which may be layered together with the continuous variation layer 100 and the reinforcing layer 200. The continuous variation layer 100, the reinforcing layer 200 and the metal layer 300, which have a plate shape, may be layered to each other, and may then be shaped into the fiber-reinforced plastic member through a heat press process.

In this case, the layering sequence of the continuous variation layer 100, the reinforcing layer 200 and the metal layer 300 and the number thereof may be variously changed, and the metal layer 300 may be made of various metal materials. For shaping by the heat press process, the synthetic resin of the continuous variation layer 100 and the reinforcing layer 200 may be thermosetting synthetic resin.

When one or more layers of the continuous variation layer 100, the reinforcing layer 200 and the metal layer 300 are separately shaped and coupled to each other, an additional bonding procedure may be required, and the bonding force therebetween may be decreased, such that those processes may not be efficient.

Therefore, by layering the continuous variation layer 100, the reinforcing layer 200 and the metal layer 300 and integrally shaping them through a heat press process, the fiber-reinforced plastic member according to exemplary embodiments may have advantages of elimination of an additional bonding procedure, increase of bonding strength due to the regulation of the shapes of respective layers, and improvement of shaping accuracy.

As shown in FIGS. 4 and 5, a method of producing the fiber-reinforced plastic member for a vehicle according to an exemplary embodiment of the present invention may include a winding operation of winding reinforcement fibers 120 impregnated with synthetic resin 110 around a mandrel 440 in such a way that the angle α of the reinforcement fibers 120 progressively varies along the length of the mandrel 440, thus forming a pipe-shaped continuous variation layer 100 (S100), a flattening operation of flattening the pipe-shaped continuous variation layer 100 into a flat plate (S200), and a shaping operation of layering the flat plate-shaped continuous variation layer 100 on a reinforcing layer 200, which comprises of a synthetic resin 210 and a plurality of reinforcement fibers embedded in the synthetic resin 210 to intersect each other in a reticular pattern, and integrally pressing both layers 100 and 200 into a fiber-reinforced plastic member through a heat press process (S300).

In the shaping operation S300, the reinforcement fibers 120, which have been supplied from a fiber supply unit, may immediately pass through an impregnating device 420. Accordingly, an additional impregnating operation may be eliminated from the process of producing the continuous variation layer 100, and thus the whole process may be simplified and the producing time may be reduced. The impregnation of the reinforcement fibers 120 with the synthetic resin 110 may be implemented in various other ways, for example, by directly applying the synthetic resin 110 to the mandrel 440 around which the reinforcement fibers 120 are wound, in addition to the application through the impregnating device 420.

The mandrel 440, which may have a cylindrical shape, may serve to wind the reinforcement fibers 120 therearound. At this point, the angles α of the reinforcement fibers 120 of the continuous variation layer 100 may be controlled by adjusting the angle of the reinforcement fibers 120, which are wound around the mandrel 440, with respect to the longitudinal direction of the mandrel 440. As shown in FIG. 4, the angle α of the reinforcement fibers 120 with respect to the longitudinal direction of the mandrel 440 may vary while the reinforcement fibers 120 are wound around the mandrel 440.

Consequently, the continuous variation layer 100, which is formed on the mandrel 440, may have a pipe shape corresponding to the surface of the mandrel 440.

In the flattening operation S200, the pipe-shaped continuous variation layer 100, which is formed in the winding operation S100, may be removed from the mandrel 440, and may be shaped into a flat plate.

In order to shape the continuous variation layer 100 into the flat plate, the pipe-shaped continuous variation layer 100 may be longitudinally cut at one side thereof and then flattened into a flat plate, or the circumferential surface of the pipe-shaped continuous variation layer 100 may be pressed diametrically into a flat plate.

When the pipe-shaped continuous variation layer 100 is longitudinally cut at one side thereof and flattened into the flat plate, the pipe-shaped continuous variation layer 100 may be cut at one side or opposite sides thereof depending on the size and shape of the mandrel 440 or the type of the resulting fiber-reinforced plastic member. In this way, the pipe-shaped continuous variation layer 100 may be cut in various manners in terms of the cut shape and the number of cuts. Since the pipe-shaped continuous variation layer 100, which has been cut at the side thereof, is in the state of not having been cured, the pipe-shaped continuous variation layer 100 may be easily shaped into the flat plate.

When the pipe-shaped continuous variation layer 100 is pressed diametrically at the side thereof into a flat plate, the cutting procedure may be eliminated and the producing process may be simplified. Furthermore, since the pressed continuous variation layer has double flat plates overlapping each other, the number of turns of the reinforcement fibers 120 may be reduced, and thus the producing time may be shortened.

In the shaping operation S300, the continuous variation layer 100 having the flat plate shape may be layered to the flat reinforcing layer 200, and may be integrally formed with the reinforcing layer 200 through a heat press process. At this point, thermally pressing the continuous variation layer 100 and the reinforcing layer 200, which are in the state of not having been cured, may be advantageous in terms of improvements in bonding ability between layers and shaping accuracy.

As shown in FIG. 4, in the winding operation S100, the angles α of the reinforcement fibers 120 of the continuous variation layer 100 may be controlled by adjusting the rotational speed of the mandrel 440.

Particularly, the angles α of the reinforcement fibers 120 may be controlled by adjusting the ratio of the rotational speed of the mandrel 440, around which the reinforcement fibers are wound, to the moving speed of a fiber positioning device 430 adapted to supply the reinforcement fibers impregnated with the synthetic resin 110 to the mandrel 440. As the rotational speed of the mandrel 440 is decreased, the reinforcement fibers 120, which are wound around the mandrel 440, may be inclined toward the longitudinal direction of the mandrel 440, that is, the angle α of the reinforcement fibers 120 with respect to the longitudinal direction of the mandrel 440 may be decreased. In contrast, as the rotational speed of the mandrel 440 is increased, the reinforcement fibers 120, which are wound around the mandrel 440, may be inclined toward the diametrical direction of the mandrel 440, that is, the angle α of the reinforcement fibers 120 with respect to the longitudinal direction of the mandrel 440 may be increased.

Furthermore, in the winding operation S100 as shown in FIG. 4, the angles α of the reinforcement fibers 120 of the continuous variation layer 100 may also be controlled by adjusting the longitudinal moving speed of the mandrel 440.

When the mandrel 440 rotates and moves horizontally while keeping the fiber positioning device 430 stationary, which is adapted to supply the reinforcement fibers impregnated with the synthetic resin 110 to the mandrel 440, increasing the moving speed of the mandrel 440 may cause the reinforcement fibers 120 to be inclined toward the longitudinal direction of the mandrel 440, that is, may cause the angle α of the reinforcement fibers 120 to be decreased. In addition, decreasing the moving speed of the mandrel 440 may cause the reinforcement fibers 120 to be inclined toward the diametrical direction of the mandrel 440, that is, may cause the angle α of the reinforcement fibers 120 to be increased.

In the winding operation S100 as shown in FIG. 4, furthermore, the angles α of the reinforcement fibers 120 of the continuous variation layer 100 may be controlled by adjusting the moving speed of the fiber positioning device 430, adapted to guide the reinforcement fibers 120 toward the mandrel 440, in the longitudinal direction of the mandrel 440.

As the moving speed of the fiber positioning device 430 for guiding the reinforcement fibers impregnated with the synthetic resin 110 is increased, the reinforcement fibers 120 may be inclined toward the longitudinal direction of the mandrel 440, that is, the angle α of the reinforcement fibers 120 may be decreased. As the moving speed of the fiber positioning device 430 is decreased, the reinforcement fibers 120 may be inclined toward the diametrical direction of the mandrel 440, that is, the angle α of the reinforcement fiber 120 may be increased.

As described above, the angles α of the reinforcement fibers 120 of the continuous variation layer 100 may be determined by the relative values between the moving speed and the rotational speed of the mandrel 440 and the moving speed of the fiber positioning device 430. Various combinations of the speeds may be realized as respective embodiments, and other embodiments in which all speeds are changed are also possible.

As shown in FIG. 3 or 5, in the shaping operation S300, the flat plate-shaped continuous variation layer 100, the reinforcing layer 200 and the metal layer 300 may be layered to each other, and may be integrally formed with each other through the heat press process, thus resulting in the final fiber-reinforced plastic member.

In this embodiment, the layering sequence and the number of continuous variation layers 100, reinforcing layers 200 and metal layers 300 may be variously changed, and the metal layer 300 may be made of various metal materials. For shaping by the heat press process, the synthetic resin 210 of the continuous variation layer 100 and the reinforcing layer 200 may be thermosetting synthetic resin.

When one or more layers of the continuous variation layer 100, the reinforcing layer 200 and the metal layer 300 are separately prepared and bond these to each other, those processes requires an additional bonding procedure, and furthermore, the bonding force between the layers may be decreased.

According to an exemplary embodiment of the present invention, the continuous variation layer 100, the reinforcing layer 200 and the metal layer 300 may be layered to each other and they may be integrally formed with each other through a heat press process. Accordingly, an additional bonding procedure may be eliminated, and an increase in the bonding strength attributable to shape regulation between the layers and an improvement in molding accuracy can be realized.

As described herein, the present invention provides a fiber-reinforced plastic member for a vehicle and a method of producing the same, and thus realizes different strengths in different areas, which is required in order to improve the collision safety performance of a vehicle body. In addition, the weight of the vehicle body may be reduced and the efficiency of the manufacturing process may be improved.

In particular, since the continuous variation layer, in which the reinforcement fibers are arranged at an incline with respect to the longitudinal direction of the fiber-reinforced plastic member and in which the angles of the fibers with respect to the longitudinal direction progressively vary along the longitudinal direction, can be layered on the reinforcing layer, including therein reinforcement fibers arranged in a reticular pattern, it is possible to satisfy the requirement for different strengths in different areas and to reduce the weight of the vehicle body.

Furthermore, since a procedure of impregnating the reinforcement fibers with synthetic resin can be eliminated, it is possible to improve economic performance and processing efficiency.

Although the various exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fiber-reinforced plastic member for a vehicle comprising:
   a continuous variation layer which comprises a synthetic resin constituting a base and a plurality of reinforcement fibers embedded in the synthetic resin, the plurality of reinforcement fibers being arranged so as to be inclined with respect to a longitudinal direction of the fiber-reinforced plastic member for a vehicle and angles of the reinforcement fibers with respect to the longitudinal direction of the fiber-reinforced plastic member progressively varying along the longitudinal direction; and
   a reinforcing layer which is attached to the continuous variation layer to constitute the fiber-reinforced plastic member for a vehicle and comprises a synthetic resin constituting the base and a plurality of reinforcement fibers, the plurality of reinforcement fibers being embedded in the synthetic resin and intersecting each other in a reticular pattern,
   wherein the continuous variation layer and the reinforcing layer constitute a pillar for a vehicle, and
   wherein the reinforcement fibers of the continuous variation layer are arranged in an anteroposterior direction of a vehicle at a lower end of the pillar and are arranged in a vertical direction of the vehicle at an upper end of the pillar.

2. The fiber-reinforced plastic member for a vehicle according to claim 1, wherein the reinforcement fibers of the reinforcing layer comprises a first group of fibers and a second group of fibers, and
   wherein the first and second groups of fibers are arranged to intersect each other in a reticular pattern.

3. The fiber-reinforced plastic member for a vehicle according to claim 1, wherein the reinforcement fibers of the reinforcing layer includes a first group of fibers and a second group of fibers,
   wherein the first group of fibers are arranged to intersect reinforcement fibers of the continuous variation layer at a lower end of the pillar, and the second group of fibers are arranged to intersect reinforcement fibers of the continuous variation layer at an upper end of the pillar, and
   wherein the first and second groups of fibers are arranged to intersect each other in a reticular pattern.

4. The fiber-reinforced plastic member for a vehicle according to claim 1, further comprising a metal layer layered together with the continuous variation layer and the reinforcing layer, wherein the continuous variation layer, the reinforcing layer and the metal layer are layered to each other into a plate shape, and are subjected to a heat press process, thus forming the fiber-reinforced plastic member for a vehicle.

5. A method of producing a fiber-reinforced plastic member for a vehicle comprising:

winding a plurality of reinforcement fibers that is impregnated with synthetic resin around a mandrel in such a way that an angle of the reinforcement fiber progressively varies along a length of the mandrel, thus forming a pipe-shaped continuous variation layer, wherein the pipe-shaped continuous variation layer comprises the synthetic resin and the plurality of reinforcement fibers embedded in the synthetic resin, the plurality of reinforcement fibers being arranged so as to be inclined with respect to a longitudinal direction of the fiber-reinforced plastic member for a vehicle and angles of the reinforcement fibers with respect to the longitudinal direction of the fiber-reinforced plastic member progressively varying along the longitudinal direction;

flattening the pipe-shaped continuous variation layer into a flat plate;

layering the flat plate-shaped continuous variation layer and a reinforcing layer comprising a synthetic resin and a plurality of reinforcement fibers embedded in the synthetic resin to intersect each other in a reticular pattern; and integrally pressing both layers into the fiber-reinforced plastic member through a heat press process, wherein the continuous variation layer and the reinforcing layer constitute a pillar for a vehicle, and wherein the reinforcement fibers of the continuous variation layer are arranged in an anteroposterior direction of a vehicle at a lower end of the pillar and are arranged in a vertical direction of the vehicle at an upper end of the pillar.

6. The method according to claim 5, wherein, in winding the reinforcement fiber, the angle of the reinforcement fiber of the continuous variation layer varies by adjusting a rotational speed of the mandrel.

7. The method according to claim 5, wherein, in winding the reinforcement fiber, the angle of the reinforcement fiber of the continuous variation layer varies by adjusting a moving speed of the mandrel in a longitudinal direction of the mandrel.

8. The method according to claim 5, wherein, in winding the reinforcement fiber, the angle of the reinforcement fiber of the continuous variation layer varies by adjusting a moving speed of a fiber positioning device that is adapted to guide the fiber to the mandrel in a longitudinal direction of the mandrel.

9. The method according to claim 5, wherein, in the layering and shaping, the flat plate-shaped continuous variation layer and the reinforcing layer comprising the synthetic resin and the plurality of reinforcement fibers embedded in the synthetic resin to intersect each other in a reticular pattern are layered to a metal layer, and the three layered layers are integrally pressed into the fiber-reinforced plastic member through the heat press process.

10. A vehicle comprising a fiber-reinforced plastic member of claim 1.

* * * * *